United States Patent
Ileogben

(10) Patent No.: US 9,052,059 B2
(45) Date of Patent: Jun. 9, 2015

(54) APPARATUS AND METHOD FOR ELEVATING AND SUPPORTING AN AIR FLOW MEASURING DEVICE

(76) Inventor: Pius Ileogben, Lawrenceville, GA (US)

( * ) Notice: Subject to any disclaimer, the term of this patent is extended or adjusted under 35 U.S.C. 154(b) by 378 days.

(21) Appl. No.: 13/090,354

(22) Filed: Apr. 20, 2011

(65) Prior Publication Data

US 2012/0267502 A1    Oct. 25, 2012

(51) Int. Cl.
| | |
|---|---|
| F16M 11/00 | (2006.01) |
| F16M 11/20 | (2006.01) |
| F16M 11/24 | (2006.01) |
| F16M 11/42 | (2006.01) |
| G01F 15/18 | (2006.01) |

(52) U.S. Cl.
CPC .............. *F16M 11/24* (2013.01); *F16M 11/42* (2013.01); *G01F 15/18* (2013.01)

(58) Field of Classification Search
CPC ................................ F16M 11/24; F16M 11/42
USPC ............ 248/346.06, 637, 650, 656, 670, 678, 248/346.07, 676, 673, 127, 146, 149, 154; 211/175; 73/663, 855, 856
See application file for complete search history.

(56) References Cited

U.S. PATENT DOCUMENTS

| | | | | |
|---|---|---|---|---|
| 4,118,002 A | * | 10/1978 | Bartlett ...................... | 248/311.2 |
| 4,673,092 A | * | 6/1987 | Lamson et al. ............... | 211/188 |
| 4,899,189 A | * | 2/1990 | Frost ............................ | 396/419 |
| 5,308,037 A | * | 5/1994 | Gonzalez ...................... | 248/670 |
| 5,322,403 A | * | 6/1994 | Herde ............................ | 414/11 |
| 5,407,171 A | * | 4/1995 | Gonzalez ...................... | 248/670 |
| 5,667,189 A | * | 9/1997 | Kester ............................ | 248/601 |
| 6,416,029 B1 | * | 7/2002 | Holtermanns .......... | 248/346.06 |
| 6,431,319 B1 | * | 8/2002 | Myers et al. .................. | 187/243 |
| 8,348,071 B1 | * | 1/2013 | Janlert ......................... | 211/175 |

* cited by examiner

*Primary Examiner* — Christopher Garft
(74) *Attorney, Agent, or Firm* — Baxam Law Group, LLC; Deanna L. Baxam

(57) ABSTRACT

Apparatus and method for elevating and supporting an air flow measuring device to enable hands-free air flow measurement.

4 Claims, 8 Drawing Sheets

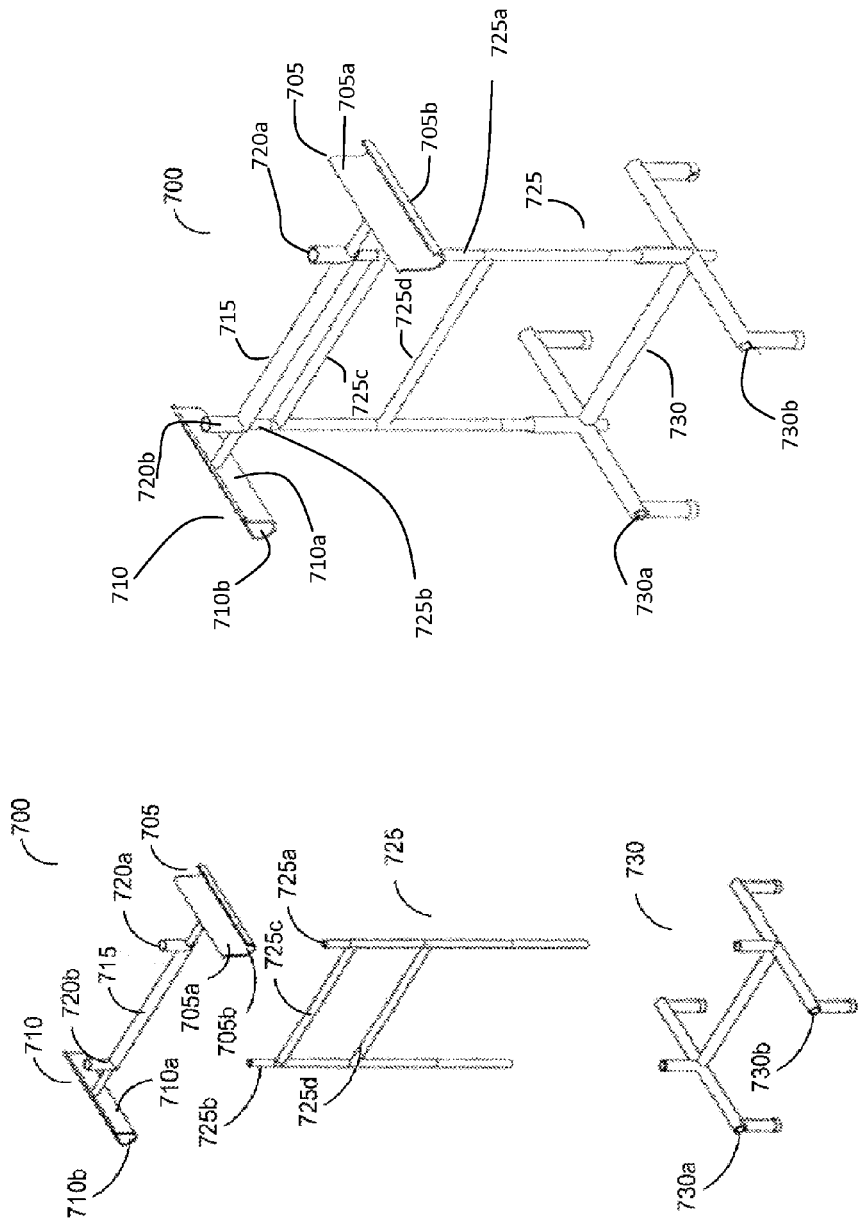

APPARATUS AND METHOD FOR ELEVATING AND SUPPORTING AN AIR FLOW MEASURING DEVICE

FIELD

The present invention relates to a stand to elevate and support an air flow measuring device.

BACKGROUND

Referring to FIG. 1, an air flow measuring device 100 is used to measure air flow from registers, diffusers and grilles, for example, for various reasons such as, to verify air flow distribution, balance buildings, and pinpoint air system deficiencies. Air flow measuring device 100 generally includes a hood 110 and base 120. The hood 110 channels air to the base 120. The base 120 includes a measuring device for measuring the air flow and a readout device.

Air flow is measured using the air flow measuring device 100 by holding and aligning the hood 100 against an air flow opening and reading the airflow measurement on the readout device such a digital display.

Air flow openings for air flow measurements are typically located in ceilings; accordingly, a technician must align and hold the air flow measuring device against an air flow opening typically using a ladder. Thus, to measure and adjust air flow, a technician must not only carry around the air flow measuring device 100 but also a ladder. There also are safety risk with the use of a ladder. Accordingly, there is a need for a more efficient and safe method to measure air flow for air flow openings in high ceilings.

BRIEF DESCRIPTION OF THE DRAWING

FIGS. 7A and 7B illustrate another exemplary embodiment of a mechanism that may be used with an air flow measuring device to facilitate elevating and supporting the air flow measuring device.

DETAILED DESCRIPTION

To measure air flow measurements in high ceilings, exemplary embodiments of the present invention elevate and support an air flow measuring device to eliminate the need for bulky ladders or enables hands-free air flow measurement.

Figure 1:
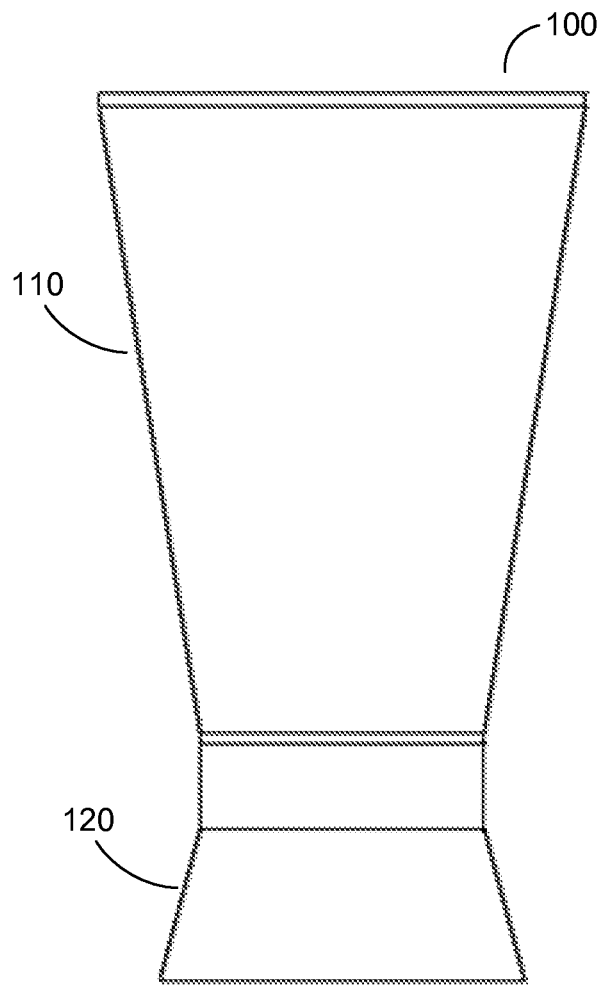
FIG. 1 illustrates a prior art air flow measuring device.
Figure 2:
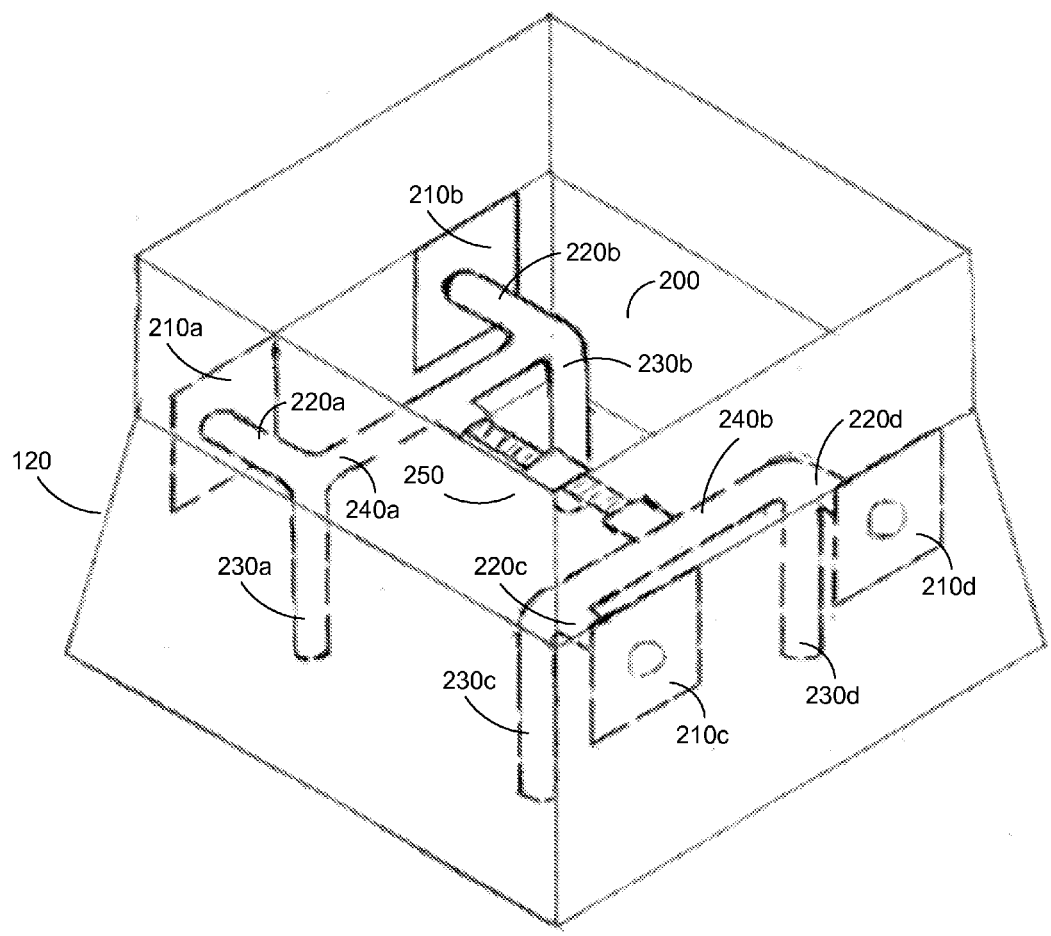
FIG. 2 illustrates an exemplary embodiment of an attachment mechanism that may be used with the air flow measuring device of FIG. 1.

FIG. 2 illustrates an exemplary embodiment of an attachment mechanism 200 that may be used with an air flow measuring device to facilitate elevating and supporting the air flow measuring device. Attachment mechanism 200 includes plates 210a-d, horizontal members 220a-d, vertical members 230a-d, connector members 240a, b, and a tensioner 250. Horizontal members 220a-d, vertical members 230a-d, and connector members 240a, b may be hollow or solid and/or may be a tube, rod, pipe, bar etc. Horizontal members 220a-d, vertical members 230a-d, and connector members 240a, b may be any material, for example, aluminum, plastic, graphite, copper, iron, etc. Preferably, horizontal members 220a-d, vertical members 230a-d, and connector members 240a, b are a material that is strong but lightweight. Horizontal pipes 220a,b, vertical pipes 230a,b, and connector pipe 240a may be one integral piece or may be detachable. Similarly, horizontal pipes 220c,d, vertical pipes 230c,d, and connector pipe 240b may be one integral piece or may be detachable.

The plates 210a-d attach to the inner surface of the base 120 and attach to horizontal pipes 220a-d, respectively. Horizontal members 220a-d extend from plates 210a-d and connect to vertical members 230a-d, respectively. Connecting pipe 240a connects horizontal member 220a and vertical member 230a with horizontal member 220b and vertical member 230b. Similarly, connecting member 240b connects horizontal member 220c and vertical member 230c with horizontal member 220d and vertical member 230d. Connecting members 240a, b may serve to reinforce attachment mechanism 200.

Tensioner 250 connects between connecting members 240a, b and may be adjusted to ensure that attachment mechanism 200 is securely fitted on the air flow measuring device. Tensioner 250 can be any adjustable device that can be adjusted to ensure that attachment mechanism 200 is securely fitted on the air flow measuring device. One of ordinary skill in the art would know how to make a tensioner 250 that can be adjusted to ensure that attachment mechanism 200 is securely fitted on the air flow measuring device. In some implementations, tensioner 250 is a predetermined length that cannot be adjusted.

Figure 3:
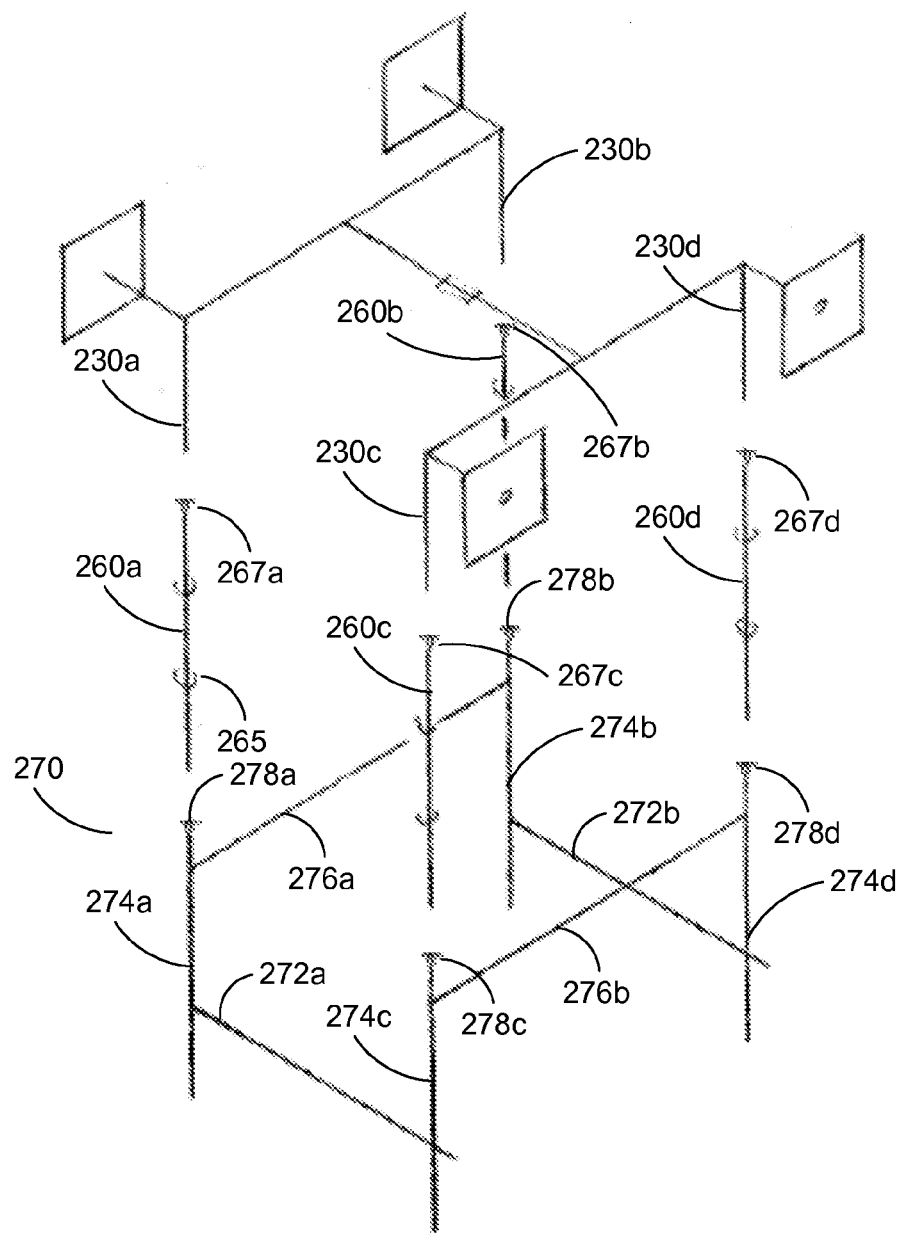
FIG. 3 illustrates an exemplary line drawing of the attachment mechanism of FIG. 2 in use with expanders and a hand base.

Referring to FIG. 3, vertical members 230a-d extend downward and are configured to connect to expanders 260a-d, receptively. Expanders may be used to elevate the air flow measuring device based on the height of the ceiling and the height of the technicians. Expanders 260a-d can be expandable, and once at the desired length, can be locked in place with expander locks 265, for example. One of ordinary skill in the art would know how to make expanders that can be adjusted and then locked in place. Expanders 260a-d may lock to vertical members 230a-d using receptor locks 267a-d, which may be on the ends of expanders 260a-d, receptively. If needed, one or more additional expanders may be cascaded together to further elevate the air flow measuring device.

The expanders 260a-d may attach to a hand base 270, which includes grab bars 272a, b, vertical members 274a-d, and connecting members 276a,b. Connecting members 276 a,b may be collapsible for portability. Vertical members 274a-d may lock to expanders 260a-d using receptor locks 278a-d, which may be on the ends of vertical members 274a-d, receptively. Grab bars 272a, b, vertical members 274a-d, and connecting members 276a,b may be the same material as horizontal members 220a-d, vertical members 230a-d, and connector members 240a, b.

The expanders and hand base may be hollow or solid and/or components thereof may be a tube, rod, pipe, bar etc. The expanders and hand base may be any material, for example, aluminum, plastic, graphite, copper, iron, etc., but preferably, is a material that is strong but lightweight.

Figure 4:
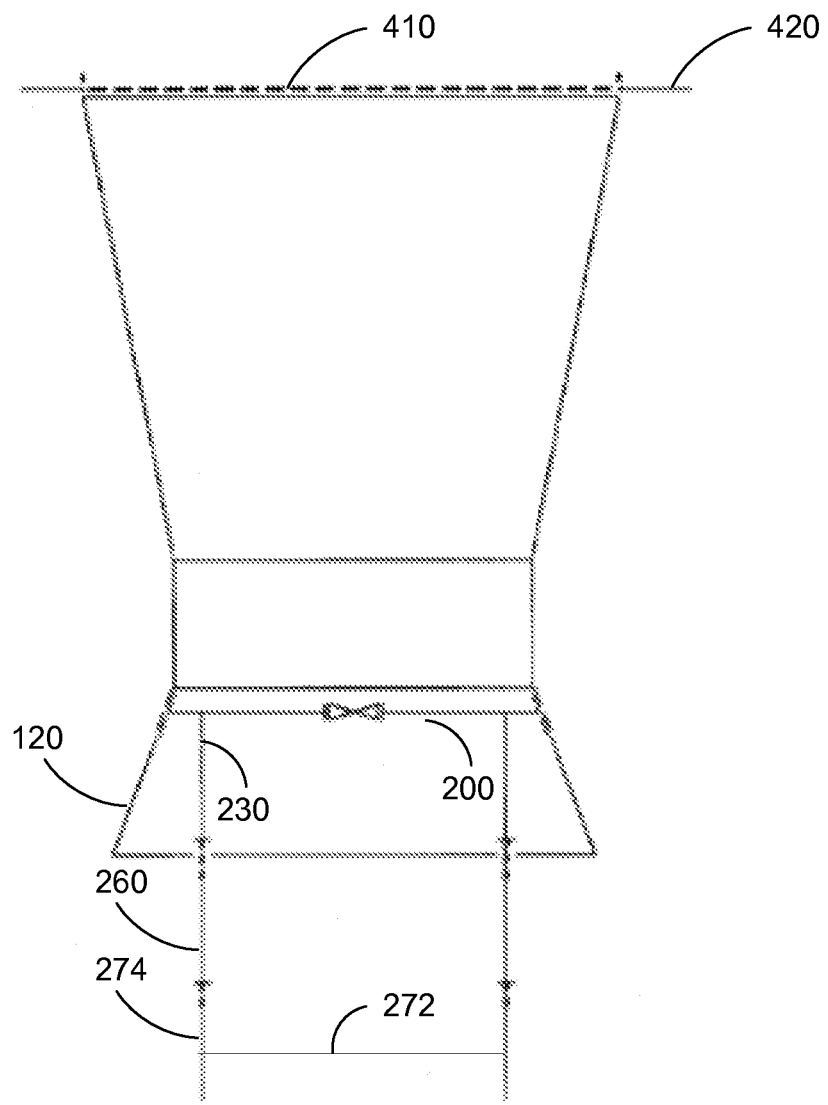
FIG. 4 illustrates an exemplary environment for using the attachment mechanism of FIG. 2 and expanders and hand base of FIG. 3.

Referring to FIG. 4, to measure air flow, for example, in a register 410 located in a high ceilings 420, attachment mechanism 200 may be attached to the inner surface of the base 120 of the air flow measuring device. Vertical members 230 of attachment mechanism 200 may be attached to expanders 260 and adjusted for additional height depending on the height of the ceiling and the technician. Expanders 260 are attached to vertical members 274 of hand base 270. A technician may lift the air flow measuring device toward the register using grab bars 272.

Figure 5:
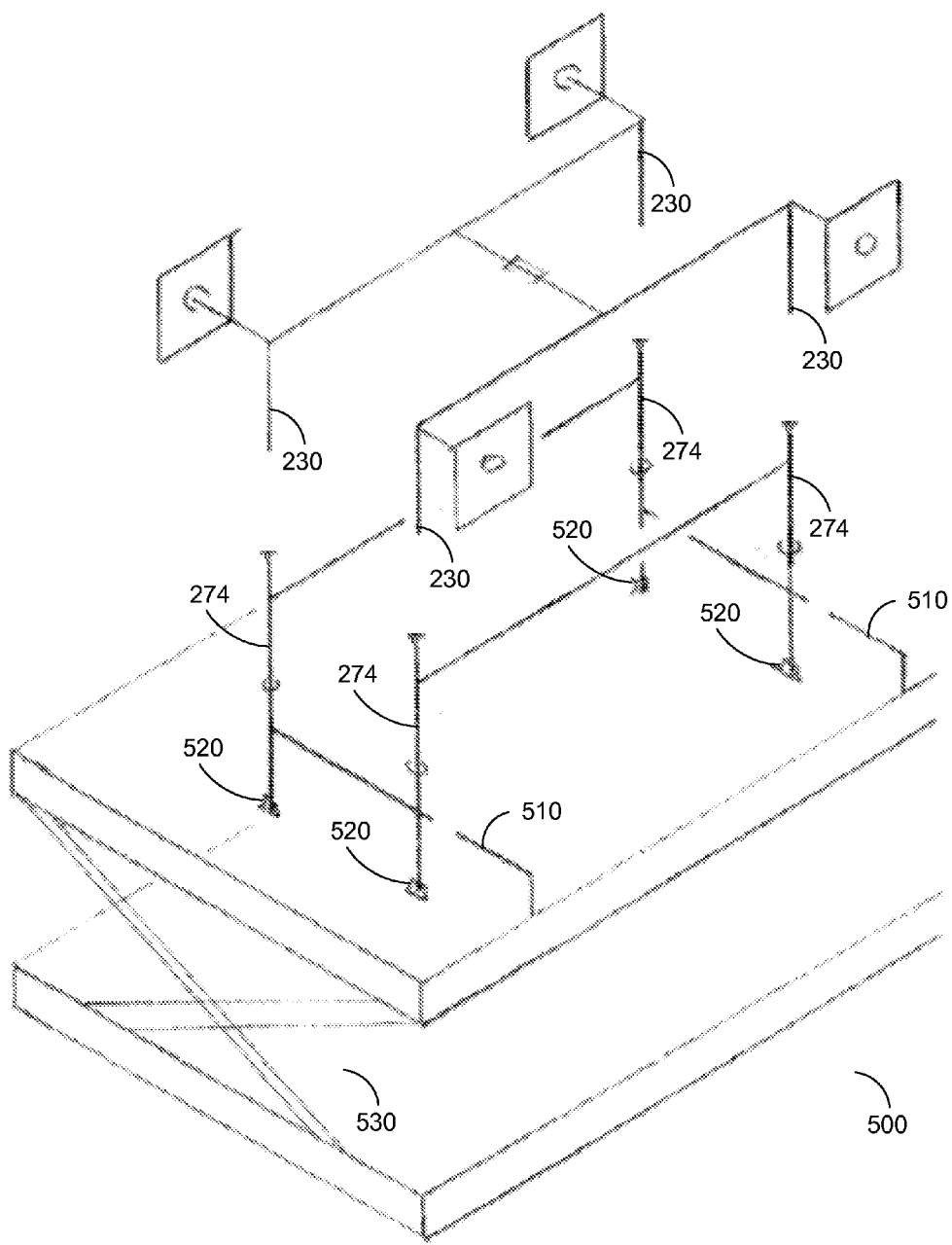
FIG. 5 illustrates an exemplary stand for use with the attachment mechanism of FIG. 2 and hand base of FIG. 3.
Figure 6:
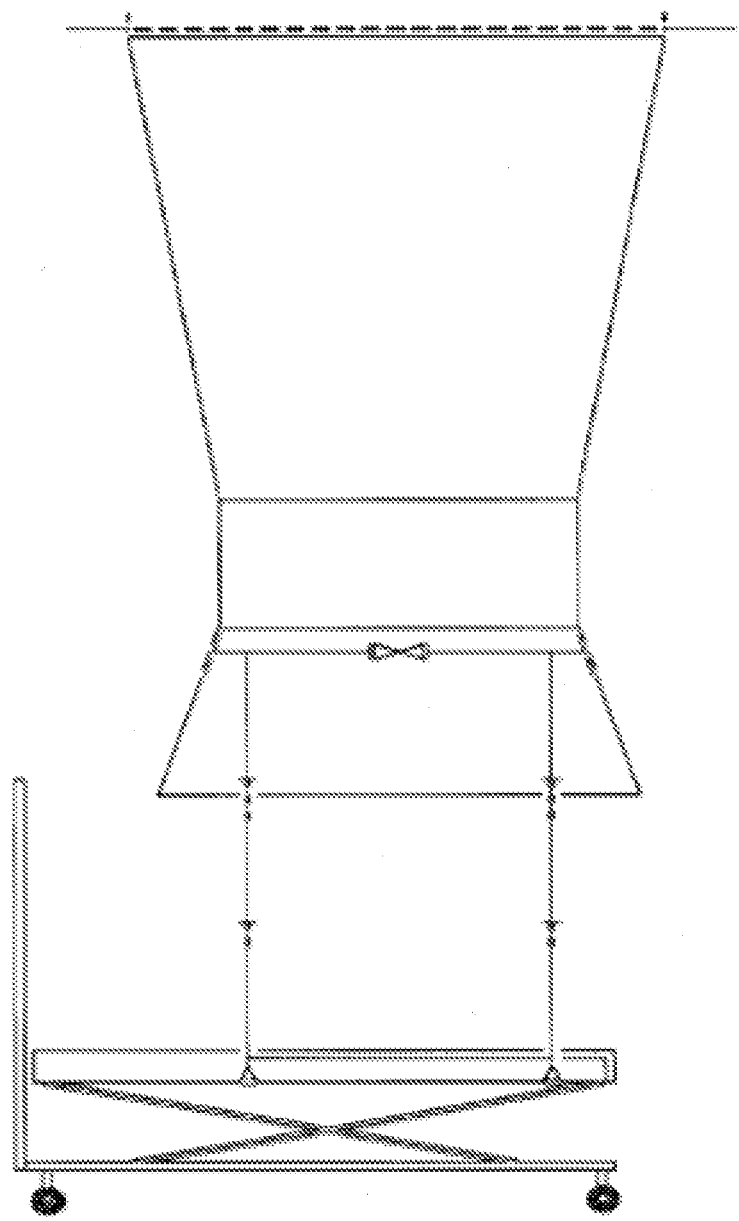
FIG. 6 illustrates an exemplary environment for using the attachment mechanism of FIG. 2, expanders and hand base of FIG. 3, and stand of FIG. 5.

For hands-free air flow measurement, a stand 500, as shown in FIG. 5, may be used. The stand 500 may include a lift 530 to adjust the height of the air flow measuring device. In this case, vertical members 230 of attachment mechanism 200 may be attached directly to vertical members 274 of hand base 270 without the use of expanders 260. To stabilize the air flow measuring device to the stand 500, stand 500 includes a retainer members 510 secured to the stand 500 that may be inserted into an aperture of vertical members 274 of hand base 270. Vertical members 274 may also include non skid pads 520. The entire assembly may be placed on a cart for portability, as shown in FIG. 6.

FIGS. 7A and 7B illustrate another exemplary embodiment of a mechanism 700 that may be used with an air flow measuring device to facilitate elevating and supporting the air flow measuring device. Mechanism 700 includes holders 705, 710, connector member 715, an expander 725, and a base 730.

Holders 705, 710 engage with opposite sides of the base 120, respectively. More specifically, the back wall 705a, 710a of the respective holders 705a, 710a engage the inner surface of the respective sides of the base 120. The bottom of the respective sides of the base 120 rest in the grove 705b, 710b of the respective holders 705, 710.

Connector 715 extends from the back walls of the holders 705, 710 and connect the holders 705, 710. In some implementations, connector 715 can be any adjustable device that can be adjusted to ensure that mechanism 700 is securely fitted on the air flow measuring device. For example, connector 715 may include a spring locking female coupler to adjust the distance between the holders 705, 710. One of ordinary skill in the art would know how to make a connector 715 that can be adjusted to ensure that mechanism 700 is securely fitted on the air flow measuring device. In some implementations, connector 715 is a predetermined length that cannot be adjusted.

Connector 715 can include one or more receptors 720a, 720b that each includes an opening to receive one or more vertical members 725a, 725b, respectively, of an expander 725. The expander 725 may be used to elevate the air flow measuring device based on the height of the ceiling and the height of the technicians. The expander 725 can be expandable, and once at the desired length, can be locked in place. One of ordinary skill in the art would know how to make an expander that can be adjusted and then locked in place. If needed, one or more additional expanders may be cascaded together to further elevate the air flow measuring device.

The expander 725 may connect to a base 730. In some implementation, base 730 may be collapsible. One of ordinary skill in the art would know how to make a collapsible base.

Components of mechanism 700 may be hollow or solid and/or may be a tube, rod, pipe, bar etc. The mechanism 700 may be any material, for example, aluminum, plastic, graphite, copper, iron, etc., but, preferably is a material that is strong but lightweight. Mechanism 700 may be one integral piece or may be detachable as, for example, shown in FIG. 7A. Holders 705, 710 and connector member 715 may be one integral piece or may be detachable. For example, holders 705, 710 may detach from connector member 715. Expander 725 may be one integral piece or components of expander 725 may be detachable. For example, vertical members 725a, 725b may be detachable from horizontal member 725c, 725d. Base 730 may be one integral piece or components of base 730 may be detachable.

Figures 8A, 8B:
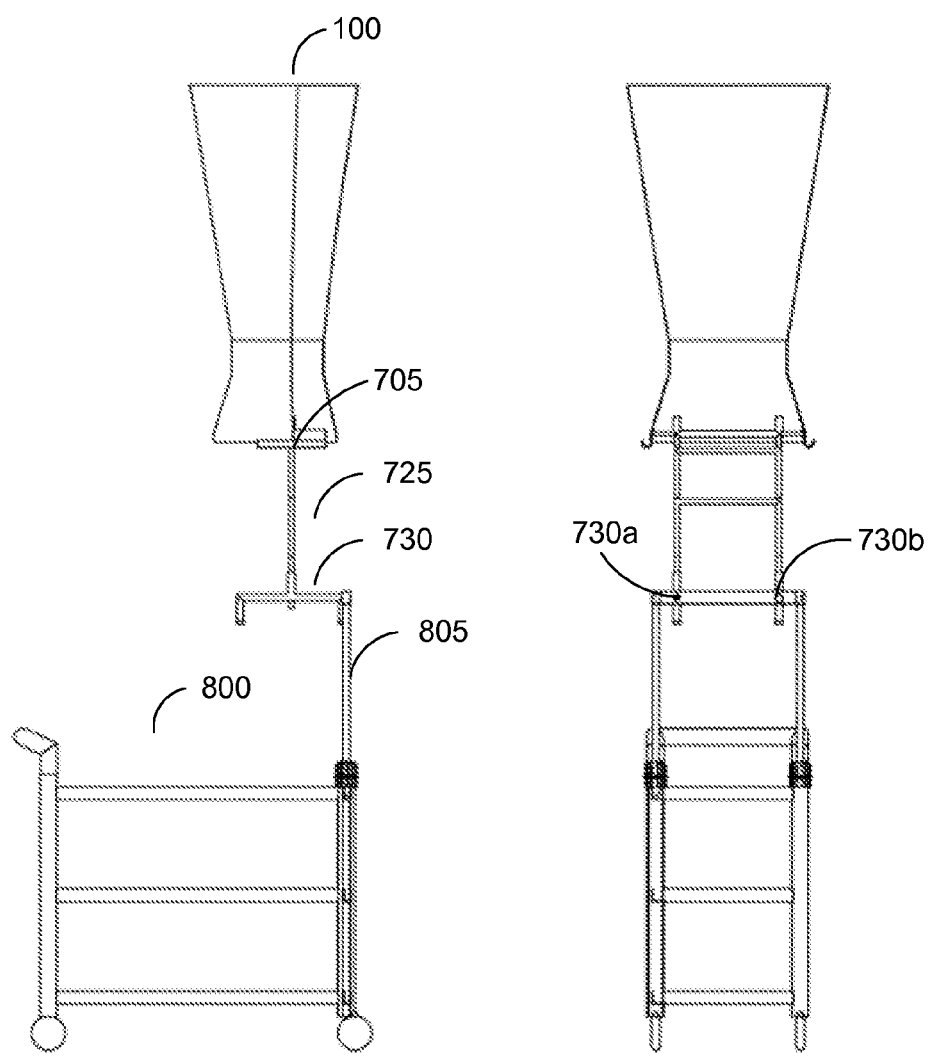
FIGS. 8A and 8B illustrate an exemplary cart that can be used with the mechanism of FIGS. 7A and 7B

FIGS. 8A and 8B illustrates another exemplary embodiment of a cart 800 that can be used for hand-free air flow measurement. To stabilize the air flow measuring device 100 and mechanism 700 to the cart 800, the base 730 can include openings 730a, 730b that can be used to connect the base 730 to a lift 805 on the cart 800 with screws, for example. The lift 805 can be used to adjust the height of the air flow measuring device.

Many modifications and other embodiments of the invention will come to mind to one skilled in the art to which this invention pertains having the benefit of the teachings presented in the forgoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Reference throughout this specification to "an embodiment" or words of similar import means that a particular described feature, structure, or characteristic is included in at least one embodiment of the present invention. Thus, the phrase "in an embodiment" or a phrase of similar import in various places throughout this specification does not necessarily refer to the same embodiment.

Furthermore, the described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

What is claimed:

1. An apparatus elevating and supporting the air flow measuring device, said apparatus comprising:
   a four-legged base,
   an attachment piece comprised of: a) a pair of oppositely positioned holders, each of which engages with one side of a base of the air flow measuring device; and b) a connector member which is centrally positioned and attached to the holders;
   an expander piece which is attached to the connector member; wherein the expander piece is composed of a pair of opposing vertically expandable elements, each of which is attached to a receptor on the connector member at one end thereof and is further attached at an opposing end thereof to the four-legged base;
   wherein engagement of the attachment piece to the air flow measuring device and the engagement of the attachment piece to the expander piece supports the apparatus and the air flow measuring device in a vertical fashion above ground without the need for the apparatus to be held by a user.

2. The apparatus of claim 1 wherein the four-legged base is collapsible and/or detachable.

3. The apparatus of claim 1 further comprising a cart including a lift.

4. The apparatus of claim 1, wherein the four-legged base further comprises at least one element for attaching the apparatus to a cart.

* * * * *